Figure 1:
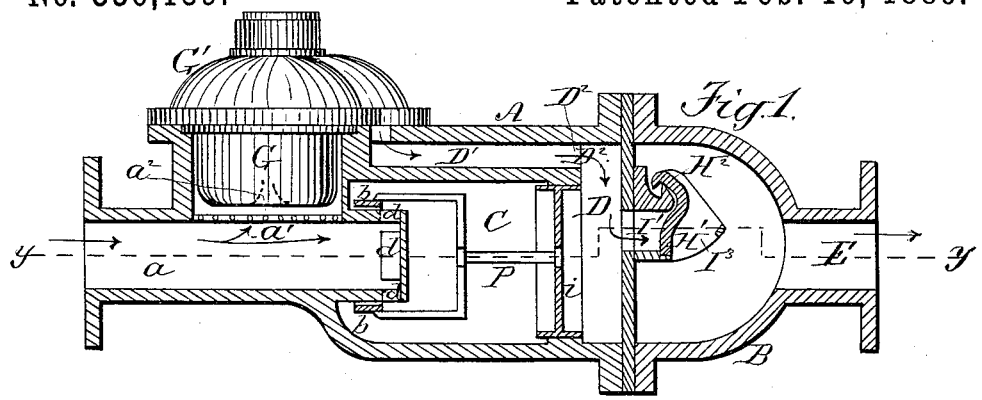

(No Model.) 2 Sheets—Sheet 1.

L. H. NASH.
METHOD OF OPERATING PROPORTIONAL WATER METERS.

No. 336,139. Patented Feb. 16, 1886.

WITNESSES
Bessie B. Johnson.
H. L. Pope.

INVENTOR
Lewis Hallock Nash
by Johnson & Johnson
Attorneys (No Model.) 2 Sheets—Sheet 2.
L. H. NASH.
METHOD OF OPERATING PROPORTIONAL WATER METERS.
No. 336,139. Patented Feb. 16, 1886.
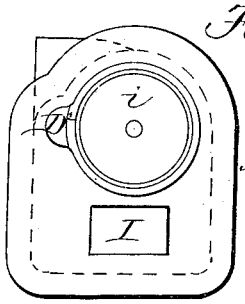
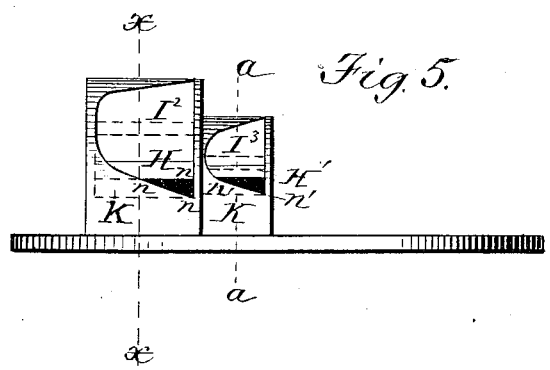
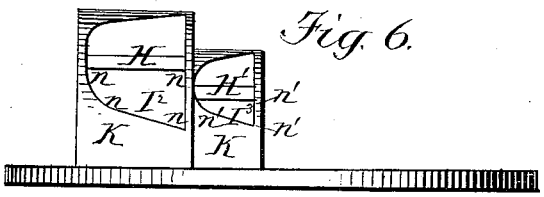
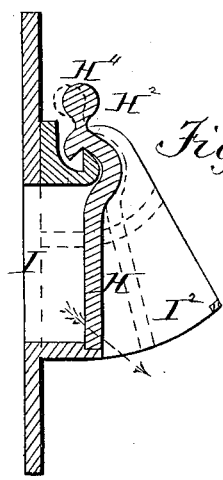
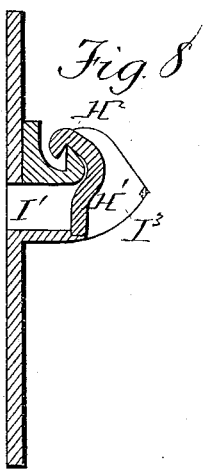
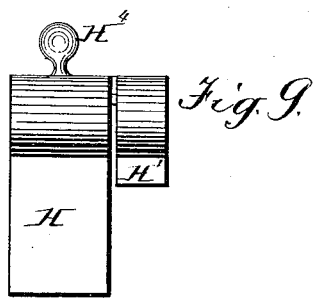
WITNESSES
Bessie P. Johnson.
INVENTOR
Lewis Hallock Nash
by Johnson & Johnson
Attorneys

UNITED STATES PATENT OFFICE.

LEWIS HALLOCK NASH, OF BROOKLYN, ASSIGNOR TO THE NATIONAL METER COMPANY, OF NEW YORK, N. Y.

METHOD OF OPERATING PROPORTIONAL WATER-METERS.

SPECIFICATION forming part of Letters Patent No. 336,139, dated February 16, 1886.

Application filed September 4, 1885. Serial No. 176,160. (No model.)

*To all whom it may concern:*

Be it known that I, LEWIS HALLOCK NASH, a citizen of the United States, residing at Brooklyn, in the county of Kings and State of New York, have invented new and useful Improvements in Methods of Operating Proportional Water-Meters, of which the following is a specification.

The invention is directed to improvements in water-meters constructed to divide the influent volume into two streams, each of which passes a definite portion of the flowing volume, one of which being measured, and the volume of both determined by such measured part by a registering device suited for the purpose. The improvement herein is directed to a method of regulating and controlling the volume passing in each stream, so that the volume in each shall be in a constant and unchanging proportion to the other; and such method consists of a compensating operation of a valve of two parts of unequal area to control the effluent-ports of the measured and non-measured streams, so as to vary the proportional areas of the discharge-ports. In my present meter the water passes through varying-sized orifices under nearly constant pressure, the variations in the flow being effected by a larger or smaller discharge-orifice for each stream, and the coacting valves compensate for the varying resistance in the two streams by controlling the relative area of the two discharge-orifices, so as to keep the ratio constant. In an application for a patent under Serial No. 163,067, the discharge in the two currents is of varying proportions, the registering device being made to compensate for this variation. In other applications for patents under Serial Nos. 169,389, 169,390, and 169,391, the organization of the meter is such that each stream is caused to discharge a definite proportion of the flow by a valve having a varying resistance adapted to control the proportional delivery of each stream by modifying the sectional area of the discharge-orifice of one of the streams, in which case the quantity of water discharged through the orifices depended upon an increase of pressure between the chambers on each side of the orifice, and the adjusting action of the valve is therein used to slightly modify the size of one of the orifices, so as to compensate for the varying resistance in the main and metered passages. My present method does not contemplate any great difference in pressure between the receiving and discharging chambers, but provides for increasing or decreasing the area of the discharge-orifices in proportion to the delivery of the device, so that each outlet-port is opened the proper area and the delivery in each stream will be a definite proportion of the whole volume.

I am aware that a patent has been granted for a proportional water-meter having a valve which opens a port for each stream in such a manner that the area of one discharge-opening always bears a definite proportion to the area of the other opening; but it is found in practice that the resistance in the main and in the metered channels are very different under different rates of flow, and that under small rates of flow this difference will overcome all measuring action of a registering device so controlled. My present method contemplates the use of a valve which has a compensating action upon the areas of the two discharge-orifices, so as to compensate for the differences of the resistance between the main and metered channels for every different rate of flow, so that each discharge-orifice shall be just the size required to pass a definite proportional quantity of water under all rates of flow.

To render the operation of the compensating-valve more sensitive and the measuring action more accurate, I provide for aiding the compensating action of the coacting valves by combining therewith a device for equalizing the pressure of the two streams at their respective discharge-orifices by means of the differences of pressure in the two channels; but a very close approximate measuring action of the coacting valves can be obtained without the use of the pressure-equalizing device.

Provision is made for preventing foreign substances flowing in the water from passing through the metered passage, and thus prevent the clogging of the measuring device.

In the accompanying drawings I have shown a water-meter organized for carrying out the method of proportional measurement which I have indicated, and in which—

Figure 2:
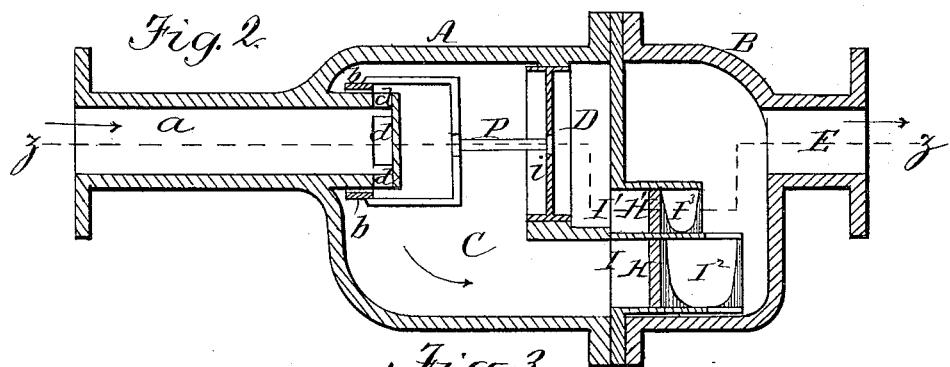
Figure 3:
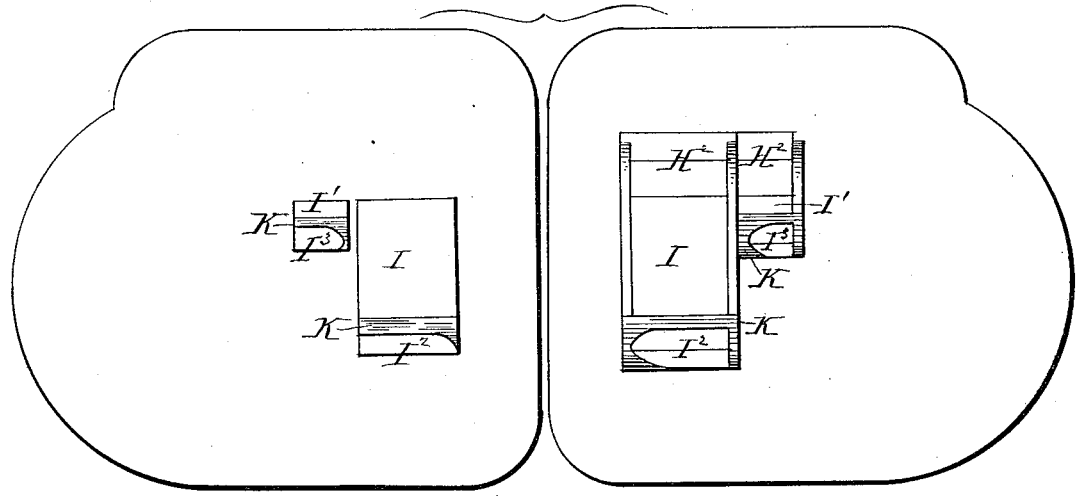

Figure 1 represents a vertical longitudinal section of a proportional water-meter embracing my invention, the said section being taken on the line z z of Fig. 2, which represents a horizontal longitudinal section taken on the line y y of Fig. 1. Fig. 3 shows in elevation both sides of the valved plate; Fig. 4, an end view of the case section with the valved plate removed. Fig. 5 represents a bottom view of the casing containing the discharge-valve orifices; Fig. 6, a similar view showing the coacting valves in different position in relation to the discharge-orifices. Fig. 7 represents an enlarged vertical section of the larger of the coacting valves and its chamber taken on the line x x of Fig. 5; Fig. 8, a similar view of the smaller of the coacting valves and casing taken on the line a a of Fig. 5. Fig. 9 shows the coacting valves in elevation.

The meter-case is cast in two sections—a receiving and a discharging section, A and B, the former section, A, containing the meter device G, proper, (shown in elevation in Fig. 1,) and the latter section, B, containing the coacting effluent valves and their discharge-passage E. The receiving-section A is divided into two chambers, C and D, the chamber C having direct communication with the influent passage a beneath the meter G and with one of the coacting effluent valves H, as shown in Fig. 2. The chamber D has communication with the influent passage a through the meter G, and direct communication with the other of the effluent valves, H', as shown in Figs. 1 and 2. The chamber-division may be made by a flexible diaphragm, $i$, connected with a valve, $b$, controlling the inflow into the chamber C, for a purpose which I will presently state; but the division may be made by a partition cast with the section, in which case the valve $b$ is not used. The effluent coacting valves H H' are placed at the junction of the two sections and are suspended in vertical positions upon the face of a plate, so as to open outward into the discharge-section, the said valve-plate being secured between the flanges of the two sections. The meter G is suspended from the top plate of the case, so that its bottom opening, $a^2$, will be just above the top of the inlet-passage a and communicate with it, while the flow through the meter G passes through the chambered dome G' above the case and communicates with the chamber D by a top passage, D', Fig. 1, which opens at the end of the case-section A by the opening $D^2$, Fig. 4.

I have not shown the meter-working parts nor the register mechanism; but it will be understood that the connecting mechanism of the meter-working parts and the register operates in the domed closure G', and that these parts may be of any suitable construction. The discharge-orifices I I' are formed in the valved plate, as shown in Fig. 3, and the valves are placed so as to swing vertically within chambers $I^2$ $I^3$, projecting from the side of said plate and opening into the chamber of the discharge-case section B, as shown in Fig. 1, so as to regulate the discharge-orifices I I' from the outer side of their respective chambers C and D. The coacting valves are rigidly connected, and are suspended by knife-edge bearings $H^2$, and may be of such weight as to swing together freely outward under the pressure of the outflow. The valve H', which controls the metered current, is of much less area than the valve which controls the main current. The valves are made very light, so as to swing with little resistance, and the larger one is provided with a counter-balance, $H^4$, which may be of such weight as to reduce the resistance of the valves to any desired degree. The valve H, being longer and wider than valve H', it will open a larger area of port-opening for the same degree of outward motion than the valve H'. When in their lowest position, they close their respective ports I I', as shown in Figs. 1, 7, and 8; but as they swing open the area opened by each will be proportional so far as these ports are concerned, and the water must pass the valves from said ports down under the swinging ends of the valves, out through bottom ports formed by the open bottoms of the chambers $I^2$ $I^3$, within which the valves are suspended and swing, as shown in the bottom views, Figs. 5 and 6, of these valve-chambers. The valves will always open their ports I I' to an extent bearing a direct proportion to each other, and if the resistance in each current were exactly the same under all rates of flow there will always be a definite proportion of water passed through each port; but since the metered and the main channels are different in their resistances, the resistance in each will differ for each rate of flow. In order to compensate for this I provide the chambers $I^2$ $I^3$ for each valve in the valve-plate, each chamber having a bottom opening or port of irregular form controlled by their respective valves, so as to vary the proportional area in a manner which I will now describe. These valve-chamber bottom openings are formed in a curved surface, K K, at the bottoms of said valve-chambers and the lower edges of the valves swing over them, but not in contact, the vertical edges of the valves having a joint forming contact with the vertical walls of each chamber, as shown in Figs. 5 and 6, and the discharge is therefore downward through the bottom chamber openings, having their area varied in a manner and for a purpose which I will now describe. As the valves rise under the pressure of the flow they will open to an extent sufficient to pass the required quantity, and will thus occupy a different position for every rate of flow. As the valves swing open to the position shown in full lines in Fig. 6 and in dotted lines in Fig. 7, the available discharge-orifice in the valve-chamber $I^2$ for the main channel C will be that bounded by the valve H and surface K, opening an area bounded by the irregular lines $n$ $n$ $n$ $n$, Fig. 6. The metered channel D will have a discharge-orifice in its valve-chamber bounded by the lines $n'$ $n'$ $n'$, Fig. 6. By forming the bounding port-lines just given of proper size and shape the area of the said port-opening $n$ may bear any desired proportion to the area of the opening $n'$ for any given position of the valves. If the valves open only to the position shown by full lines in Fig. 5, the area of the said port-openings will be much smaller for a different rate of flow, and the proper operation of these valves will be determined by actual test for each rate of flow, and when so determined the flow through both valves will be in the proper proportion for every position of the valves in any particular case. In testing the meter to obtain this result, we would first form a trial outline of the bottom port-openings, $n$ and $n'$, and then test the meter under different rates of flow. It will be found that the discharges of the two passages are not in the same proportion under the different rates of flow, and also that the valves will swing into a new position corresponding to each rate of flow. Now, to correct this record of the meter I proceed as follows, viz: Suppose under a given discharge the valves hang in the position shown in full lines in Fig. 5, and that the meter measures a greater proportion of the water than it should measure, I then either enlarge the area $n\ n\ n\ n$ by filing away some of this port, or close the area of the port-opening $n'$ until the discharge in the main channel is the desired proportion of the whole. Then, taking a larger rate of flow the valves will open wider, and, as before, I change the relative sizes of these port-openings until the discharge for this rate of flow is what is desired, and so proceed until the same proportional quantity of water will pass through these valve-ports under all rates of flow, which is the required condition. Thus whatever the resistance of the metered channel and whatever that of the main channel it will be found by actual test, and the shape of the port-openings is determined to compensate for these resistances, and hence the streams having been thus once balanced against each other for all conditions of flow the device is reliable for all future time. This proportional relation between the valve-port openings may be obtained by adjusting the area of both or either of them, for increasing the area of one is in effect the same as decreasing the area of the other; but I find in practice it is convenient to adjust both port-areas for both streams, to the end that the valves will operate to control the relative area of the said discharge-ports by the volume of the flow, so as to keep the ratio constant, the said valves being controlled by the variations in the volume of the flowing currents.

The provision for excluding foreign substances that would injure and clog the meter working parts from passing with the stream into the meter G consists of a screen, $a'$, placed in the influent passage just below and covering the bottom opening of the meter-case in such relation to the flowing volume as to be continually washed by it, and thereby itself kept from being clogged, while preventing particles of matter from entering the meter and interfering with the proper operation of the measuring device.

As shown, the provision for dividing the chambers C and D consists of a flexible diaphragm, $i$, fitted in a band and caused to move or yield within the band by the differences in the pressure of the water in the two chambers. Centrally it is connected to a rod, P, which is connected to and controls a ring-valve, $b$, fitted upon the inner end of the influent passage $a$, so as to open and close ports $d$ therein by sliding over them, and controlling their area according as it is moved by the movement of the diaphragm. The object of this flexible diaphragm is to equalize the pressure in the two chambers, thereby assisting in the operation of adjusting the shape of the valve-port openings and balancing the resistance to the meter device proper. Instead of the diaphragm a piston may be used. Its combination with the effluent valves renders their compensating action more delicate and the meter will be rendered more accurate under small rates of flow; but, as before stated, this pressure-equalizing diaphragm or piston with its connected inflow-controlling band-valve is not an essential to the proper operation of the compensating function of the coacting valves in modifying the discharge-port openings of the valve chambers or closures so as to vary their area to make the ratio of the two streams constant.

The coacting compensating-valves, their construction, their combination in a proportional water-meter, and with the ports thereof are not claimed herein, as such matters form the subject of a separate and distinct application for a patent filed by me of even date herewith.

I claim—

1. The improved method herein described of measuring water flowing in divided streams, which consists in varying the proportional areas of the discharge-orifices for each rate of flow to control the proportional delivery of the divided streams, substantially as described.

2. The method herein described of measuring water flowing in divided streams, which consists in causing a stream to pass through a metered passage equalizing the pressure of the two streams at their respective discharge-openings by means of the difference of pressure in the two passages, and controlling the relative area of the said discharge-openings by coacting valves operated by the differences of flow, substantially as described.

In testimony whereof I have hereunto set my hand in the presence of two subscribing witnesses.

LEWIS HALLOCK NASH.

Witnesses:
H. W. BRINCKERHOFF,
WILLIAM C. WESTERVELT.